(No Model.) 2 Sheets—Sheet 1.
A. W. EDDY & H. P. JONES.
BAND CUTTER AND DISTRIBUTING FEEDER FOR THRESHING MACHINES.

No. 577,731. Patented Feb. 23, 1897.

WITNESSES:

INVENTORS
A. W. Eddy
H. P. Jones
BY
ATTORNEYS.

(No Model.) 2 Sheets—Sheet 2.
A. W. EDDY & H. P. JONES.
BAND CUTTER AND DISTRIBUTING FEEDER FOR THRESHING MACHINES.
No. 577,731. Patented Feb. 23, 1897.
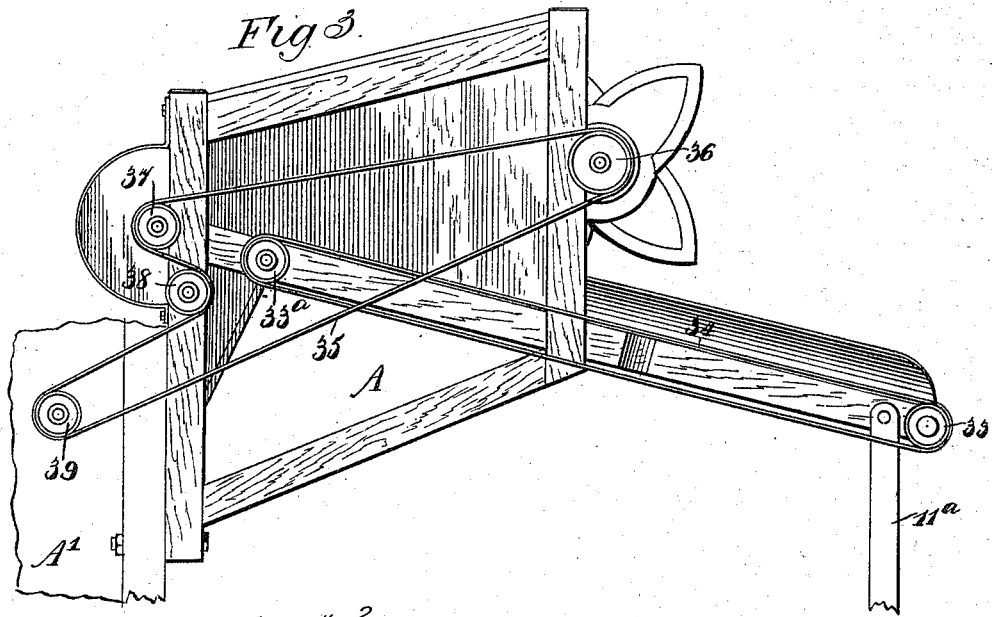
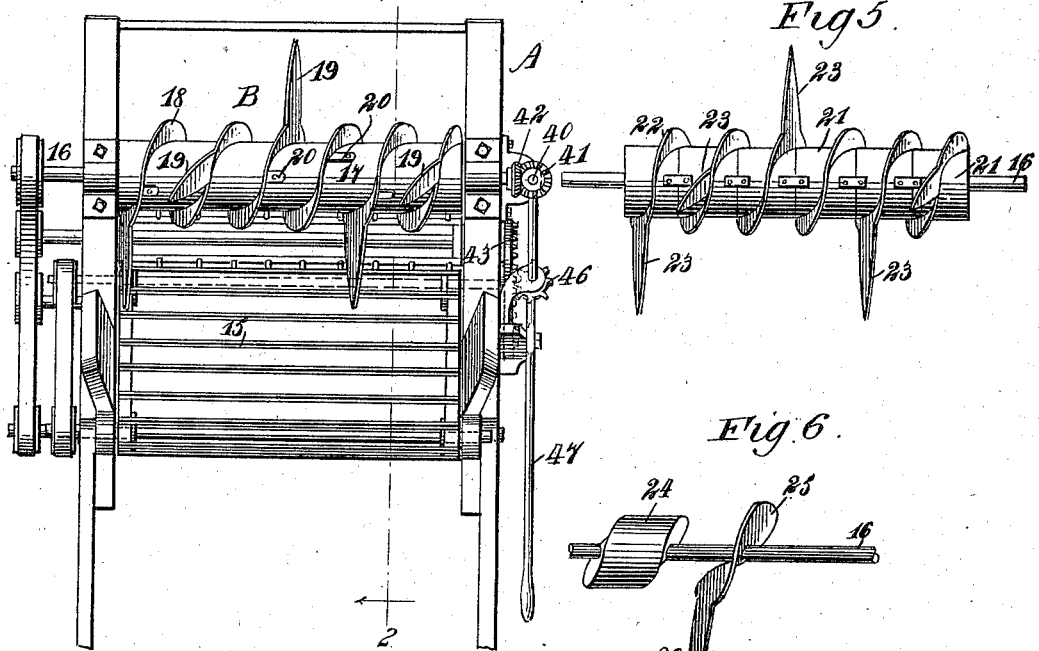
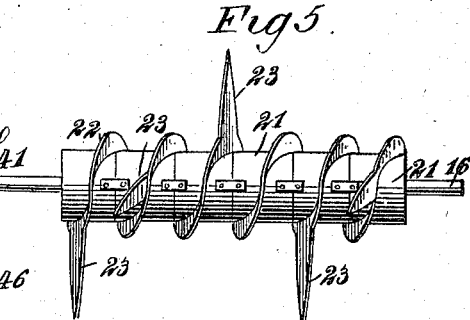
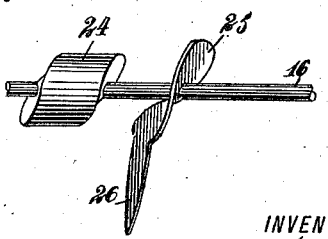
WITNESSES:
INVENTORS
A. W. Eddy
H. P. Jones
BY
ATTORNEYS.

UNITED STATES PATENT OFFICE.

ASAHEL W. EDDY AND HARVEY P. JONES, OF COLERIDGE, NEBRASKA; SAID JONES ASSIGNOR TO SAID EDDY.

BAND-CUTTER AND DISTRIBUTING-FEEDER FOR THRESHING-MACHINES.

SPECIFICATION forming part of Letters Patent No. 577,731, dated February 23, 1897.

Application filed April 6, 1896. Serial No. 586,436. (No model.)

*To all whom it may concern:*

Be it known that we, ASAHEL W. EDDY and HARVEY P. JONES, of Coleridge, in the county of Cedar and State of Nebraska, have invented a new and Improved Band-Cutter and Distributing-Feeder for Threshing-Machines, of which the following is a full, clear, and exact description.

The object of the invention is to provide a simple, durable, and economic device for the distribution of the straw and grain to the cylinder of threshing-machines and for cutting the bands of the bundles fed to the attachment; and a further object of the invention is to so construct the band-cutting and feeding-plates and knives that they will work with great despatch and will act to distribute the grain in a uniform manner for presentation to the concave and cylinder of the thresher.

The invention consists in the novel construction and combination of the several parts, as will be hereinafter fully set forth, and pointed out in the claim.

Reference is to be had to the accompanying drawings, forming a part of this specification, in which similar characters of reference indicate corresponding parts in all the figures.

Figure 1:
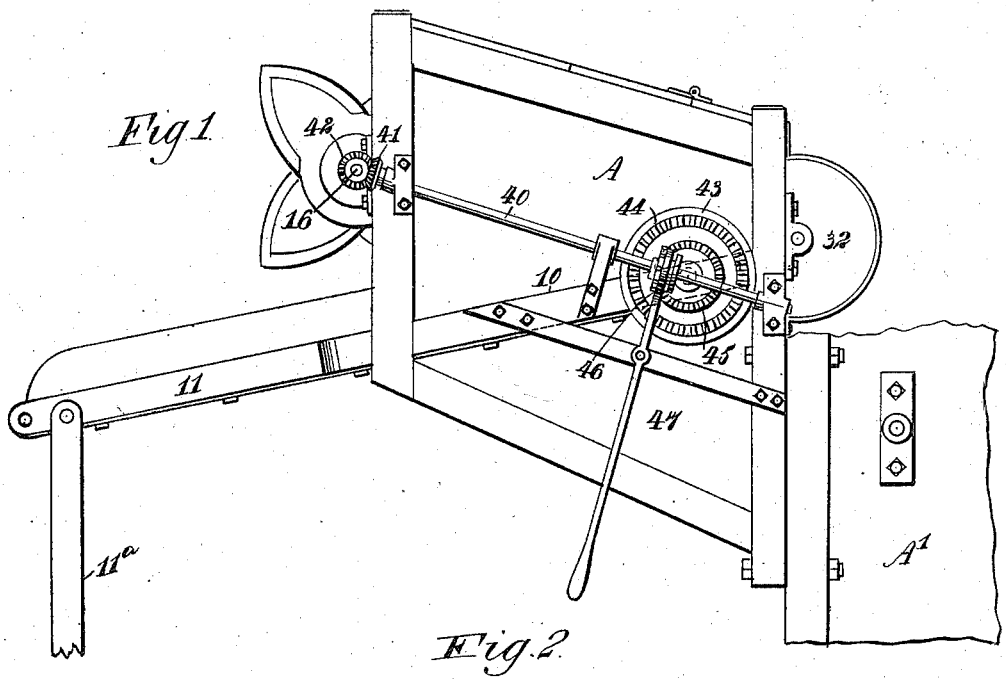
Figure 2:
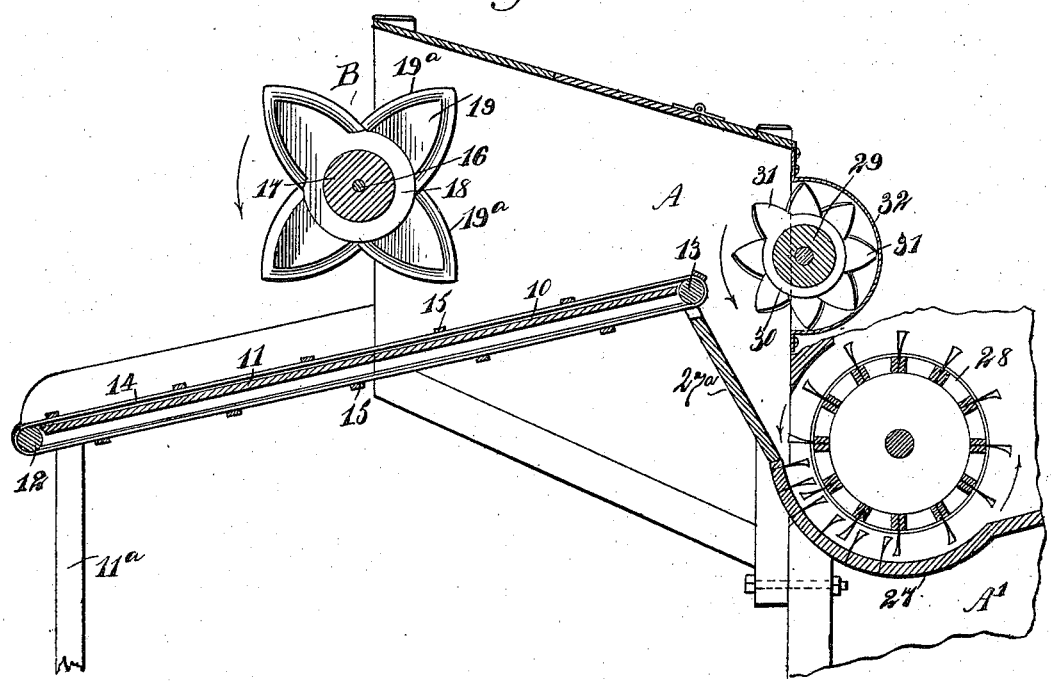

Figure 1 is a view of one side of the improved attachment. Fig. 2 is a vertical section taken through the attachment and through the concave and cylinder of the threshing-machine to which the attachment is applied, the said section being taken on the line 2 2 of Fig. 4. Fig. 3 is a view of the side of the machine opposite that shown in Fig. 1. Fig. 4 is a front elevation of the attachment. Fig. 5 is a detail view of the band-cutting and feeding device removed from its casing, illustrating a slight modification in its construction. Fig. 6 is a detail perspective view of a further modification of the band-cutting and feeding device, and Fig. 7 is a section taken through the shifting gear and through a portion of the shifting lever connected with the said gear.

In carrying out the invention a casing or housing A is employed, adapted for attachment to the corresponding portion of a threshing-machine A', the interior of the casing or housing A of the attachment communicating directly with the cylinder and concave of the threshing-machine. The housing or casing A of the attachment has an inclined floor 10, which extends from a point near its rear downwardly to a point near the front, and preferably the said floor is carried a predetermined distance in an inclined manner beyond the front of the housing, forming an extension-floor 11, having suitable side pieces to prevent the bundles which are to be placed on the floor from slipping off at the sides.

The floor 10 may be continuous or it may be made in sections having a hinged connection, and the outer end portions of the floor, together with the side pieces thereof, form a table for the reception of the bundles, and the said table is supported by legs 11$^a$ or their equivalents. At the outer end of the said table a roller 12 is journaled, while at the inner end of the continuation of the table, or the floor 10 in the casing, a second roller 13 is journaled. Endless bands 14 are passed over these rollers, and the said bands are connected by strips 15, which may be provided with pins, if desired, the belts and strips constituting a conveyer adapted to carry the bundles into the casing or housing A.

At the front portion of the housing or casing A the shaft 16 of the band-cutter and feeder B is properly journaled, and the band-cutter and feeder usually consists of a drum 17, secured to the shaft 16 between the inner side faces of the housing or casing A, and a spiral blade 18 is secured upon the exterior surface of the drum, the blade being in one continuous piece, and each convolution of the blade is provided with a cutter 19, which is preferably made integral with the blade or may be attached thereto. The cutters are of lance-like construction, as shown best in Figs. 1, 2, and 3, and each edge 19$^a$ of each cutter is beveled or otherwise sharpened.

The various cutters are so placed that no two cutters will travel in the same path or interfere in the least with one another while the device is in operation, and naturally the cutters have the same angularity or spiral formation as the convolutions of the blade of which they may form a part. The blade 18 may be secured to the drum in any desired way. Preferably, however, the blade is provided with a number of feet 20, as shown in Fig. 4, which are bolted or otherwise attached to the drum.

In Fig. 5 we have illustrated a slight modification in the construction of the band-cutting and feeding device. In this form of the device the blade is also spiral, but the said blade is made in a number of sections 22, each section having a lance-like cutting-tooth or cutter 23, and each blade-section is either made integral with or is secured to a section 21 of the drum, the several drum-sections being tied together in any suitable or approved manner. In Fig. 6 yet another modification of the band-cutter construction is shown. Under this latter construction spiral or twisted disks 25 are mounted on the shaft 16, having a predetermined angularity with reference to the shaft, and each disk is provided with a cutter 26. The several disks employed are located between spaced or drum sections 24, the ends whereof are rendered spiral to conform to the side contours of the disks.

The concave 27 and the cylinder 28 of the threshing-machine are of any desired construction and receive the grain, the bands of which have been cut. The concave 27 is connected with the inner end of the floor 10 of the casing by an inclined board or plate 27$^a$. The grain is distributed on the conveyer by the blades and cutters 18 and 19 or whatever form of these parts that may be used. The grain and straw are further distributed just before being delivered to the cylinder of the threshing-machine through the medium of a distributing-feeder 29, held to revolve at the rear of the casing A of the attachment within a suitable outside cover 32. This feeder is also provided with spiral blades 30 and knives 31, projected from the convolutions of the spirals of the blades, the knives being out of registry one with the other, and the edges of these knives are blunt or square, so that they will not have a cutting action on the straw, but purely a distributing action. The distributing-feeder 29 and the cylinder 28 are made to travel at preferably the same rate of speed.

At one side of the attachment, as shown in Fig. 3, a pulley 33 is secured upon an extremity of the conveyer-roller 12, a like pulley 33$^a$ being secured upon the corresponding end of the inner conveyer-roller 13, and an endless belt or chain 34 is passed over these two pulleys. A driving-belt 35 is passed over a pulley 36 on the band-cutter shaft 16, thence over a pulley 37, attached to the shaft of the distributing-roller, and then usually the said belt is passed around an idler 38 and then over a pulley 39, attached to the shaft of the threshing-machine cylinder. At the opposite side of the attachment-casing A a shaft 40 is journaled in suitable bearings, and the shaft at its front end has a gear 41 attached to it engaging with a gear 42 on the band-cutter shaft 16. At this side of the machine a speed-wheel 43 is secured upon the outer end of the inner conveyer-roller 13, the said speed-wheel being provided with two or more sets of annularly-arranged teeth 44 and 45, and either set of teeth may be engaged by a pinion 46, splined and mounted to slide upon the shaft 40, as shown in Fig. 7, the said pinion being connected with a shifting lever 47, as is particularly shown in Fig. 1, so that the speed of the conveyer may be increased or diminished, as occasion may demand.

A great advantage derived by the spiral construction of the blades of the band-cutter and feeder is that the cutters attached are carried out of alinement with each other, all of the cutters standing at a different inclination to the shaft 16, and in the event that the material should be piled up high on the conveyer the plates will serve in a great measure to separate the upper layers, and owing to the fact that the cutters are sharpened all around or on both sides in the event the cutters should become dulled in the field the entire band-cutting and separating device may be turned end for end and the opposite and sharper edges of the cutters be brought into play.

Having thus described our invention, we claim as new and desire to secure by Letters Patent—

A band-cutter having a shaft, a series of blocks fixed to the shaft, each block having its ends formed with a waved surface, such surface being regular and unbroken, and a series of knives each having a body portion consisting of a disk twisted to accurately conform to the shape of the ends of the blocks and each disk being clamped between the contiguous ends of the blocks, each knife also having a blade projecting from the disk, substantially as described.

ASAHEL W. EDDY.
                HARVEY P. JONES.

Witnesses:
  F. E. JONES,
  C. R. APPELGATE.